Figure 1:
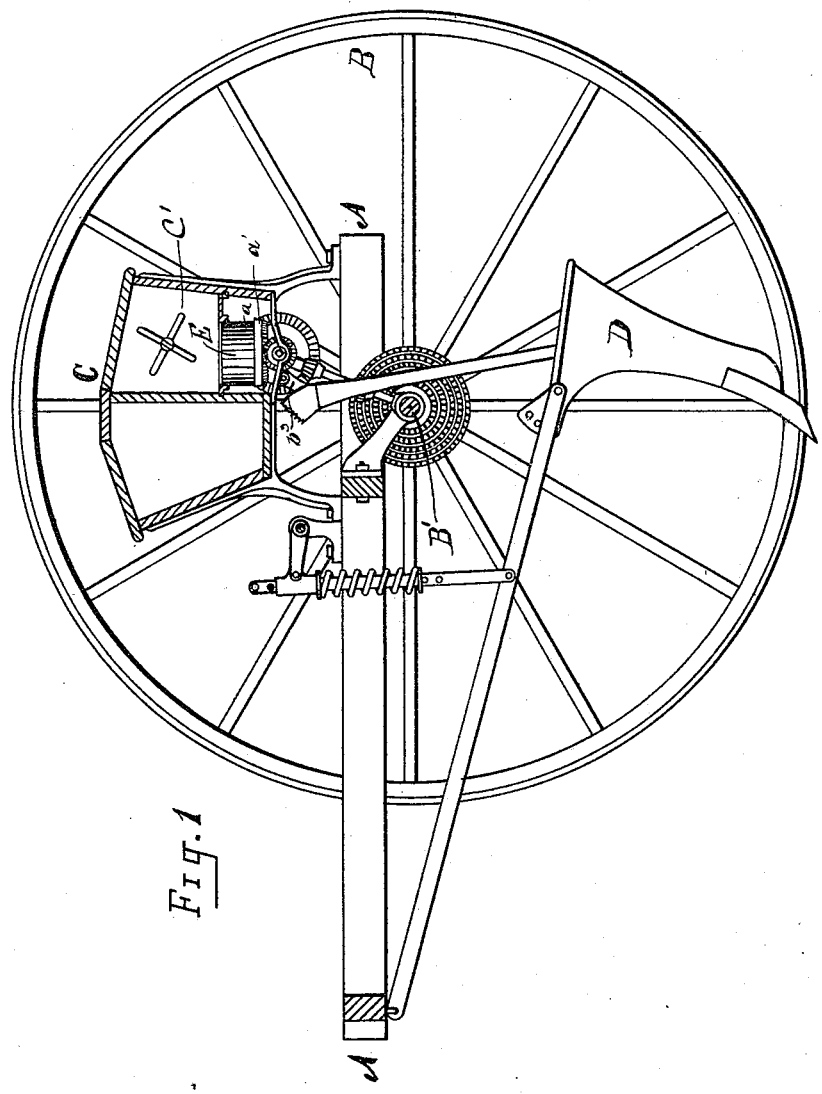

(Model.) 2 Sheets—Sheet 1.

J. W. COOK & C. E. PATRIC.
FERTILIZER DISTRIBUTER.

No. 450,308. Patented Apr. 14, 1891.

WITNESSES
D. F. Graham
Chas. J. Welch

INVENTOR
Jerome W. Cook
and Charles E. Patric
By (Model.) 2 Sheets—Sheet 2.
J. W. COOK & C. E. PATRIC.
FERTILIZER DISTRIBUTER.
No. 450,308. Patented Apr. 14, 1891.
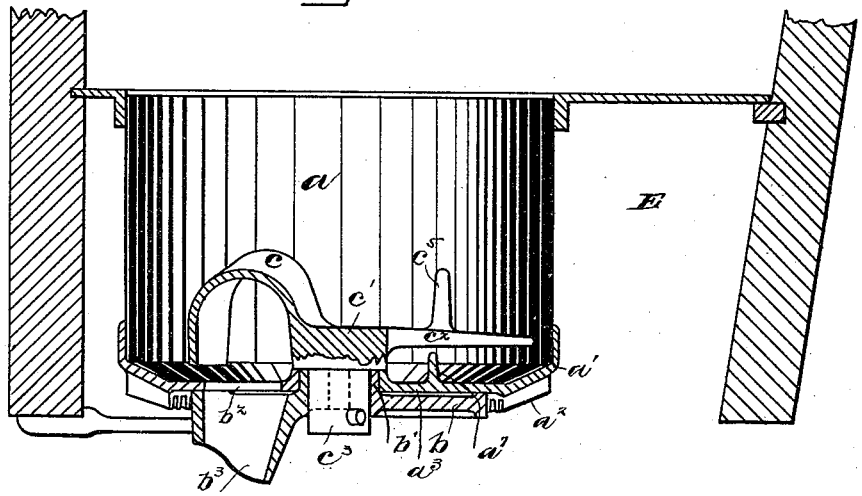
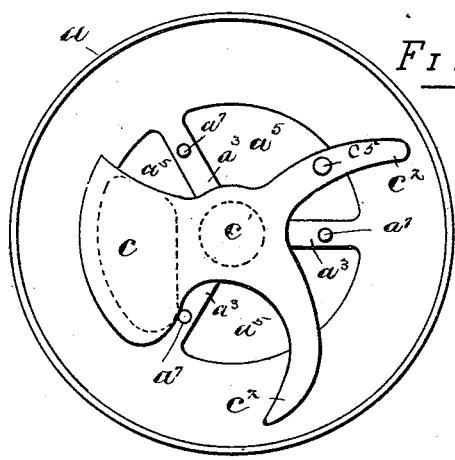
WITNESSES
D. F. Graham
Chas. J. Welch
INVENTOR
Jerome W. Cook
and Charles E. Patric
By Paul A. Staley
Attys.

UNITED STATES PATENT OFFICE.

JEROME W. COOK AND CHARLES E. PATRIC, OF SPRINGFIELD, OHIO, ASSIGNORS TO THE SUPERIOR DRILL COMPANY, OF SAME PLACE.

FERTILIZER-DISTRIBUTER.

SPECIFICATION forming part of Letters Patent No. 450,308, dated April 14, 1891.

Application filed January 30, 1890. Serial No. 338,610. (Model.)

*To all whom it may concern:*

Be it known that we, JEROME W. COOK and CHARLES E. PATRIC, citizens of the United States, residing at Springfield, in the county of Clark and State of Ohio, have invented certain new and useful Improvements in Fertilizer-Distributers, of which the following is a specification.

Our invention relates to fertilizer-distributers especially adapted for use with grain-drills, and it particularly relates to that class of fertilizer-distributers in which revolving cups are adapted to receive the fertilizing material, means being provided for discharging said fertilizing material from the cups as they are revolved around a given point.

The object of our invention is to provide in this class of fertilizer-distributers means for more thoroughly agitating and breaking up the fertilizing material when composed of adhesive or sticky ingredients, or those tending to pack or bridge over in the cups—such, for instance, as hen-manure and fertilizers containing tobacco-stems and similar substances.

Our invention consists in the constructions and combinations of parts hereinafter described, and set forth in the claims.

In the accompanying drawings, Figure 1 is a vertical sectional view of a grain-drill to which our fertilizer-distributer is attached. Fig. 2 is a sectional view of a portion of the hopper, showing one of our improved fertilizer-distributers, it being understood that a series of these will be used in a grain-drill in the usual manner. Fig. 3 is a top plan view of the revolving cup and agitating and feeding mechanism. Fig. 4 is a perspective view in detail of the same.

Like parts are represented by similar letters of reference throughout the several views.

In the said drawings, A represents the main frame of a grain-drill; B, one of the supporting and driving wheels; C, the hopper, and D one of the hoes. The hopper C is preferably divided into two parts, one of which C' is adapted to receive the fertilizing material and the other the grain or seed to be sown.

E is one of the fertilizing-distributers, which is arranged in the hopper C', as shown in Fig. 1, and is adapted to be driven by suitable means from the main shaft B', on which the driving and supporting wheels B are connected.

Each of the fertilizer-distributers E consists, essentially, of a cylindrical cup $a$, preferably formed of galvanized iron or other suitable sheet metal, and is attached at the bottom to a driving wheel or ring $a'$, preferably provided with beveled gear-teeth $a^2$, through the medium of which motion is communicated thereto, and to the cup $a$ immediately under the driving wheel or ring $a'$ is a supporting plate or frame $b$, which is suitably connected to the bottom of the hopper and provided with a central hub $b'$, on which the hub of the driving-wheel $a'$ is journaled. The driving wheel or ring $a'$ is formed open between its hub and the outer rim, the hub being connected to the rim by a series of arms $a^3$ $a^3$ $a^3$, preferably three in number, thus forming pockets or spaces $a^5$ between the said arms and above the supporting disk or frame $b$.

The supporting disk or frame $b$ is adapted to close the pockets $a^5$ and form a bottom therefor, save at the point $b^2$, where an opening is formed, as shown at Fig. 2 and in dotted lines at Fig. 3, a suitable conduit $b^3$ being provided leading from said opening to the tube and thence to the hose in any well-known and desirable manner.

Immediately above the opening $b^2$ we provide a housing $c$, which is preferably cast integral with a hub $c'$, and curved radial arms $c^2$ $c^2$, which are located above the arms of the driving ring or wheel $a'$. This housing and the radial arms are preferably supported on a stud $c^3$, which extends down through the hub of the supporting-plate $b$ and is suitably connected thereto so as to remain stationary with the housing over the opening $b^2$ while the cup $a$ and the driving-ring $a'$ revolve. Each of the arms $a^3$ is preferably provided with a projecting stud $a^4$, adapted, as the driving-ring $a'$ is revolved, to pass under the radial arms $c^2$ $c^2$ and through the housing $c$, the arm $c^2$ being elevated sufficiently above the bottom of the cup or the driving-ring to permit these studs to pass under the same. We also provide one or more of the radial arms $c^2$ with an upwardly-projecting spur $c^5$, extending upwardly into the cup $a$, as shown in Figs. 2 and 4.

The operation of the device is as follows: The driving-ring $a'$ and the cup $a$ are revolved in the bottom of the hopper and receive the fertilizing material therefrom, the cup $a$ being sufficiently large to insure the material entering therein, a suitable agitator being used in the hopper above the cup, if desired. The supporting-plate $b$, the housing $c$, and the radial arms attached to said housing remain stationary, while the driving wheel or ring, with its arms and projections, revolves with the cup. The arms $c^2$ and the projections $c^5$ serve to break up and loosen the fertilizing material and cause the same to pass into the spaces $a^5$ between the arms $a^3$ of the driving-ring, by which it is carried under the housing $c$ and discharged through the opening $b^2$. The housing $c$ is made with a large opening and tapered gradually downward, as shown in Fig. 4, so that as the material is carried therein by the action of the driving-ring it is forced positively through the opening $b^2$. The projecting studs $a^7$, passing through the same, prevent any accumulation or sticking of the material in the housing. The projecting spur $c^5$ on the radial arms extending into the cup prevents any bridging of the material above the radial arms or over the housing $c$.

A fertilizer-distributer as thus described is especially adapted for distributing that class of fertilizers which, though loose in their nature, are adapted to pack or adhere together, so as to bridge over the operating parts.

Having thus described our invention, we claim—

1. The combination of a plain cylindrical revolving cup having an open top and bottom, the periphery of said cup being connected at the bottom to a central hub by radial arms, a solid base under said radial arms having a single discharge-opening, a stationary housing arranged above said opening, and projecting stationary arms on said housing arranged above said traveling radial arms, one or more of said stationary arms being provided with a projecting spur, substantially as specified.

2. The combination of an open cylindrical revolving cup adapted to turn upon a stationary base-plate having a single discharge-opening therein, the outer periphery of said cup being connected at the bottom to an inner hub by radial arms, a stationary housing above said feeding-opening provided with projecting stationary arms arranged above said traveling arms, and projecting spurs on said traveling arms adapted to pass through said housing, whereby said traveling arms are caused to revolve between the stationary plate and the stationary projecting arms, substantially as specified.

3. The combination, with a supporting-frame having a feeding-opening, of an open traveling plate or disk adapted to revolve above said supporting-plate, and a housing arranged above said opening having an inclined or wedge-shaped top, and projections on said traveling plate adapted to pass through said housing, substantially as specified.

4. The combination, with a supporting-plate having a feeding-opening therein, of a traveling disk or wheel having openings adapted to pass said feeding-opening, an open cylindrical revolving cup supported on said traveling disk or wheel, a stationary housing above said feeding-opening, and stationary projecting arms above said traveling disk, said housing being formed with an inclined or wedge-shaped top, substantially as specified.

5. The combination, with a supporting-plate having a feeding-opening therein, of an open traveling disk or wheel having openings adapted to pass said feeding-opening, an open cylindrical revolving cup supported on said traveling disk or wheel, a stationary housing arranged above said feeding-opening, stationary projecting arms arranged above said traveling disk, projections on said traveling disk adapted to pass under said stationary arms and through said housing, and a projecting spur on one or more of said stationary arms, substantially as specified.

6. The combination, with a revolving cup having an open bottom and a stationary base or frame having a feeding-opening therein, of a stationary housing arranged above said opening, said housing being open at both ends in the direction of the revolution of said cup, and having a channel concentric with said cup, formed with an inclined or wedge-shaped top to force the material through said opening, substantially as specified.

In testimony whereof we have hereunto set our hands this 27th day of January, A. D. 1890.

JEROME W. COOK.
CHARLES E. PATRIC.

Witnesses:
RICHD. H. RODGERS,
ADDISON S. RODGERS.